United States Patent
Wang

(10) Patent No.: US 8,080,231 B2
(45) Date of Patent: Dec. 20, 2011

(54) PROCESS FOR MAKING NANOPOROUS ULTRAFINE ALPHA-ALUMINA POWDER

(75) Inventor: Yuhu Wang, Littleton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 652 days.

(21) Appl. No.: 11/050,135

(22) Filed: Feb. 2, 2005

(65) Prior Publication Data

US 2005/0135995 A1 Jun. 23, 2005

Related U.S. Application Data

(63) Continuation of application No. 10/406,060, filed on Apr. 2, 2003, now abandoned.

(51) Int. Cl.
*C01F 7/02* (2006.01)
(52) U.S. Cl. .......................... 423/628; 423/625; 216/88
(58) Field of Classification Search .................. 423/625, 423/628; 51/307, 309; 106/3; 438/692, 438/693
See application file for complete search history.

(56) References Cited

U.S. PATENT DOCUMENTS

| | | | |
|---|---|---|---|
| 4,657,754 A | 4/1987 | Bauer et al. | |
| 5,312,791 A * | 5/1994 | Coblenz et al. | 501/153 |
| 5,389,352 A | 2/1995 | Wang | |
| 5,626,715 A | 5/1997 | Rostoker | |
| 6,194,317 B1 | 2/2001 | Kaisaki et al. | |
| 6,258,137 B1 | 7/2001 | Garg et al. | |
| 6,364,920 B1 | 4/2002 | Garg et al. | |
| 6,391,072 B1 | 5/2002 | Garg | |
| 6,440,187 B1 | 8/2002 | Kasai et al. | |
| 6,461,584 B1 | 10/2002 | Wen et al. | |
| 2002/0052288 A1 | 5/2002 | Krell et al. | |
| 2002/0111027 A1 | 8/2002 | Sachan et al. | |
| 2003/0098529 A1 | 5/2003 | Drumm et al. | |

FOREIGN PATENT DOCUMENTS

| | | |
|---|---|---|
| EP | 0 281 265 A1 | 2/1988 |
| EP | 0 585 761 A1 | 8/1993 |
| EP | 554908 | 11/1993 |
| WO | WO-00/69790 | 11/2000 |
| WO | WO-03/044122 | 5/2003 |

OTHER PUBLICATIONS

Janbey et al., "A new chemical route for the synthesis of nanocrystalline ?-Al2O3 powder," *Journal of the European Ceramic Society* vol. 21, pp. 2285-2289 (2001).

Rajendran, "Production of ultrafine alpha alumina powders and fabrication of fine grained strong ceramics," *Journal of Materials Science* vol. 29, pp; 5664-5672 (1994).

Zeng et al., "A New Sol-Gel Route Using Inorganic Salt for Synthesizing Al2O3 Nanopowders," *NanoStructured Materials* vol. 10(4), pp. 543-550 (1998).

Wang et al., "Preparation of Nanoscale $\alpha$-$Al_2O_3$ Powder by th Polyacylamide Gel Method," NanoStructured Materials 11:1263-1267 (1999).

* cited by examiner

*Primary Examiner* — Edward Johnson
(74) *Attorney, Agent, or Firm* — Abel Law Group, LLP

(57) ABSTRACT

The present invention provides nanoporous α-alumina powders comprising powder comprising interconnected α-alumina primary particles having an average particle size of less than about 100 nm and an interpenetrated array of pores or voids. The invention also provides nanosized α-alumina powders comprising α-alumina particles having an average particle size of less than about 100 nm and slurries, particularly aqueous slurries, which comprise nanosized α-alumina powders of the invention. The invention further provides methods of manufacturing nanoporous α-alumina powders and nanosized α-alumina powders of the invention and methods of polishing using slurries of the invention.

17 Claims, 3 Drawing Sheets

PROCESS FOR MAKING NANOPOROUS ULTRAFINE ALPHA-ALUMINA POWDER

CROSS-REFERENCE TO RELATED APPLICATION(S)

This application is a continuation of U.S. Ser. No. 10/406,060 filed Apr. 2, 2003 now abandoned, which is incorporated by reference.

FIELD OF THE INVENTION

The present invention relates to nanosized α-alumina particles, nanoporous α-alumina gels and methods of making same and more particularly to nanosized α-alumina particles having an average particle size of less than about 100 nm. The present invention also relates to chemical mechanical polishing compositions (CMP) comprising α-alumina particles of the invention and CMP polishing methods using same.

BACKGROUND OF THE INVENTION

Ultra-fine alumina (aluminum oxide) powder is one of the most widely used ceramic materials in a variety of industries. Applications of fine alumina powders include use as abrasives for polishing semiconductor and precision optical components, catalyst supports including the support structure in automobile catalytic converters, fillers for polymers, and pigment for painting, and the like. Alumina has over twelve (12) different crystalline phases, each of which has a different lattice structure and physical properties. However, the most well known and commonly used alumina powders are γ-alumina and α-alumina. The low temperature phase, γ-alumina, is thermodynamically metastable and transforms to the thermodynamically stable phase, α-alumina, at temperatures in excess of about 1100° C. or about 1200° C. depending on various conditions. With a defective spinel structure, γ-alumina powder can have very small particle sizes, e.g., particle sizes of less than about 20 nm, and extremely high surface area, e.g., greater than about 300 m$^2$/g. Moreover, γ-alumina can be processed via both vapor and liquid phase processing techniques. Ultrafine γ-alumina having an average particle size of less than 40 nm and a polishing slurry with γ-alumina are commercially available. Ultrafine γ-alumina having an average particle size of less than 40 nm and a polishing slurry with γ-alumina are commercially available.

The density of α-alumina is about 20% higher than the density of γ-alumina and more chemically and mechanically durable than γ-alumina. Thus, nanosized α-alumina particles should be suitable for a greater range of applications than nanosized γ-alumina. However, during the phase transformation, due to the reorganization of oxygen in the crystal lattice, the alumina particle size increases drastically such that α-alumina prepared from γ-alumina normally has a particle size of greater than 100 nm.

To make nanosized α-alumina, e.g., α-alumina particles of less than about 100 nm, has been a challenge for an extended period of time. To prevent the particle from rapid grain growth is the key. It is well known that fine α-alumina powders having an average particle size of greater than 100 nm can be prepared via a seeded sol-gel process. In the process, boehmite is first peptized in acidic aqueous solution, containing nitric acid or acetic acid and then a couple of weight percent of α-alumina seeds, usually fine α-alumina particles, are added to the solution during the peptization to allow phase transformation to occur at lower temperature. The sol is oven dried at about 100° C. and converted to a dry gel. After crushing to micron sized granules, they are fired at a high temperature, normally over about 1000° C. to the produce of α-alumina particles. The temperature must be well controlled to prevent particle growth. However, in this process micron sized grains remain intact during the phase transformation process and result in mechanically strong hard grains of α-alumina after completion of the transformation. To make nanoalumina particles, high mechanical energy is required to crush or break down the grain into primary particles which typically have an average particle size of more than 100 nm. Moreover, the grinding process frequently results in high levels of impurity contamination.

U.S. Pat. No. 5,312,791 recites a modified approach to prepare alumina grains and fibers. The starting material is boehmite that is peptized and then dispersed in water to generate an alumina sol. The sol is rapidly cooled in liquid nitrogen or, alternatively slowly cooled by freeze drying. Water is sublimed under vacuum from the sol to form a gel composed of flakes having a thickness of between 1 and 3 µm. By the process recited in '791 patent, finer alumina powders, flakes, fibers, and grains can be made having micron-sized smallest dimensions. However, as the powders themselves have no porosity, they require high mechanical energy grinding to form smaller particles which introduces high levels of impurities into the α-alumina product.

Given these and other deficiencies observed in the art, it would be highly desirable to develop smaller and more homogeneous α-alumina powders of higher purity and methods for the production thereof.

SUMMARY OF THE INVENTION

This invention provides a technique to make stable nanoporous α-alumina powders and nanosized α-alumina powders. The invention further provides slurries comprising same which comprise no or very little chemical additives for suspension stability. The slurry of the invention provides a high material removal rates on silicon dioxide ($SiO_2$) and further provides very good surface finishing. The methods of manufacturing the nanoporous α-alumina powders of the invention comprise seeding an aqueous solution of an alumina precursor with nanosized α-alumina seed particles, adding a water soluble polymer to make an organic/inorganic sol, freeze drying the sol and firing the dried sol to form a nanoporous α-alumina powder. Nanosized α-alumina powders of the invention are prepared by breaking or crushing the nanoporous α-alumina powders.

The present invention provides nanoporous α-alumina powders which comprises interconnected α-alumina primary particles having an average particle size of less than about 100 nm and an interpenetrated array of pores or voids. The term "nanoporous α-alumina powder," as used herein, is intended to include α-alumina powders composed of porous aggregated particles of α-alumina, e.g., secondary polycrystalline alumina particles, where each porous particle comprises a plurality of interconnected primary particles having an average particle size of less than 100 nm and a plurality of voids or pores. The size of nanoporous α-alumina particles are not particularly limited. Typically nanoporous α-alumina powders of the invention comprise a broad distribution of polycrystalline aggregated particles of between 500 nm and about 100 µm.

The invention further provides a nanosized α-alumina powder comprising α-alumina particles having an average particle size of less than about 100 nm and slurries comprising same. The nanosized α-alumina powders of the invention are typically prepared by milling, crushing or otherwise breaking apart nanoporous α-alumina powders of the invention to liberate the primary α-alumina particles of the porous α-alumina particles.

As the term is used herein, "nanosized α-alumina powders" are intended to refer to α-alumina powders which are composed of α-alumina particles having an average particle size of less than about 100 nm. More preferably, substantially all of the α-alumina particles of the nanosized α-alumina powders of the invention are less than about 100 nm.

The invention further provides a process for the production of nanoporous α-alumina powders which comprises the steps of providing an inorganic sol comprising at least one alumina precursor and a plurality of α-alumina seed particles;

adding at least one water soluble organic polymer to the inorganic sol to form an organic-inorganic sol;

freeze drying the organic-inorganic sol to form a solid gel; and firing the solid gel at a temperature capable of combusting the organic polymer and inducing α-alumina formation of a nanoporous α-alumina powder comprising interconnected α-alumina primary particles.

In yet another embodiment, the invention provides a process for the production of a nanosized α-alumina powder comprising α-alumina particles having an average particle size of less than about 100 nm, the process comprising the steps of:

providing a nanoporous α-alumina powder comprising interconnected α-alumina primary particles having an average particle size of less than about 100 nm and an interpenetrated array of pores or voids; and breaking the nanoporous α-alumina powder to form a nanosized α-alumina powder comprising the α-alumina primary particles of the nanoporous α-alumina powder.

The invention further provides polishing methods which include the use of α-alumina powders and slurries as a polishing agent. The polishing method comprises the steps of:

providing slurry comprising a nanosized α-alumina powder which comprises α-alumina particles having an average particle size of less than about 100 nm; and applying the slurry to an interface between the substrate and a polishing pad.

Other aspects and embodiments of the invention are discussed below.

DETAILED DESCRIPTION OF THE INVENTION

Figure 1:
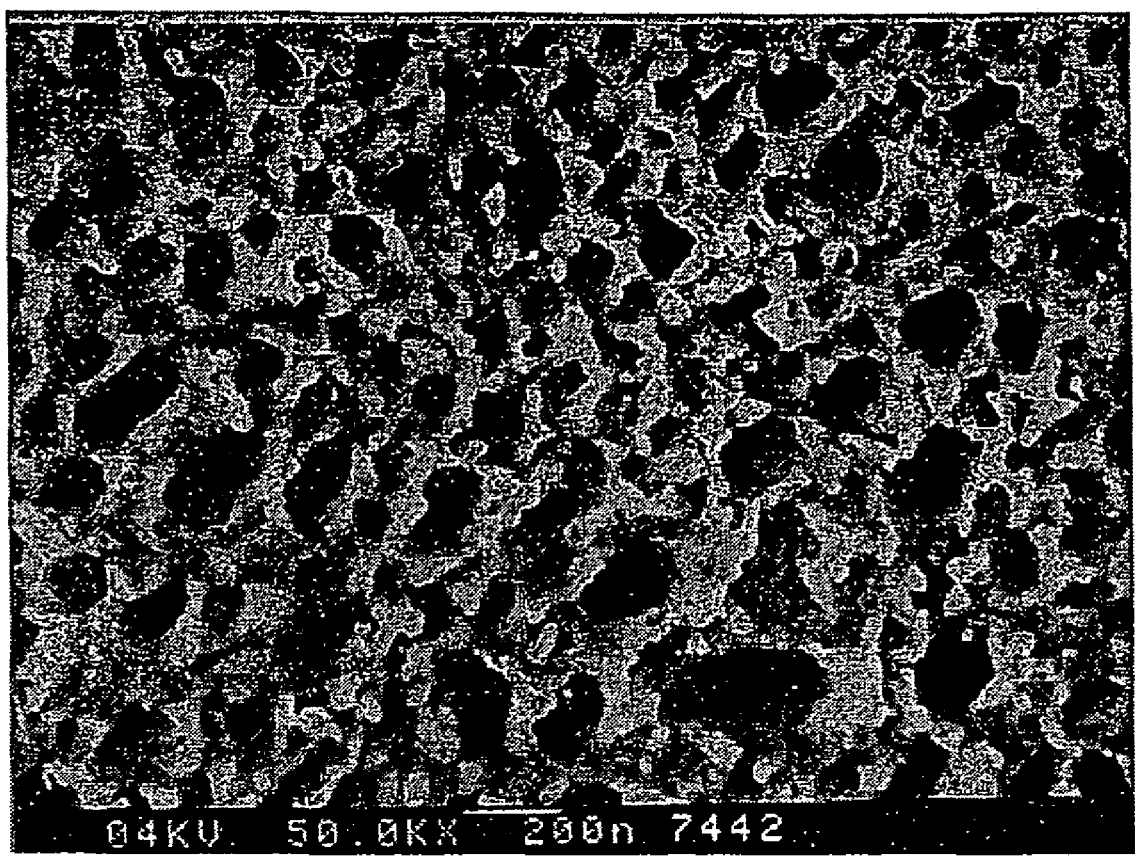
FIG. 1 is a scanning electron micrograph of a nanoporous α-alumina powder of the invention.

The α-alumina powders and slurries comprising same provided by the present invention are suitable for use in various applications including, for example, polishing, CMP applications, catalyst support materials, and the like. The nanoporous α-alumina powders of the present invention are particularly suited for use as catalyst support materials, insulation materials, filtration media and other applications where materials having pores or voids on a nanometer scale are desirable. The nanosized α-alumina powders and slurries are particularly suited for use in polishing and CMP applications because α-alumina particles of the invention possess exceptional hardness and have an average particle size of between 10 nm and about 100 nm. Moreover, the α-alumina particles of the invention offer high material removal rates with minimal substrate defectivity.

The nanosized α-alumina powders of the invention are suitable for polishing of a variety of hard materials including, but not limited to, sapphire, spinel, silicon, corundum, and other materials having a corundum structure. The nanosized α-alumina powders may also be used in combination with one or more chemical additives for chemical mechanical polishing application (CMP). Preferred substrates for CMP using the nanosized α-alumina powders of the invention include semiconductor substrates having one or more metal deposited thereon. Preferred metals include platinum, palladium, tantalum, tungsten, copper, silver, gold deposited upon a silicon dioxide substrate.

As discussed above, the present invention provides nanoporous α-alumina powders which are composed of an interconnected array of α-alumina primary particles having an average particle size of less than about 100 nm and an interpenetrated array of pores or voids. More preferably, the primary α-alumina particles of the interconnected array have an average size of between about 10-100 nm, between about 20-90 nm, between about 25-80 nm, or between about 30-70 nm. Other preferred nanoporous α-alumina powders of the invention comprise an interconnected array of α-alumina primary particles, wherein at least 99% of the α-alumina primary particles have a size within about a distribution of about 10 nm.

Typically, the interconnected α-alumina primary particles are connected by necking. That is, α-alumina primary particles increase in size during the phase transformation thereby causing adjacent particles to fuse. In preferred embodiments the "neck," i.e., the area of adjacent particles which have fused is between about 10% and about 90% of the cross-section of the α-alumina primary particles.

The size and shape of the pores or voids of the porous α-alumina particles present in the nanoporous α-alumina powders are not particularly limited. In certain preferred embodiments, such as catalyst supports and the like, it may be desirable for the pores or voids to be sufficiently large to permit one or more reactants or products to enter or exit the porous particles. Any pore or void size which permits facile milling or crushing of nanoporous α-alumina powders are suitable for use in the production of nanosized α-alumina powders of the invention. Preferred nanoporous α-alumina powders of the invention comprise porous particles in which the pores or voids have a minimum dimension of between about 20 nm and about 400 nm. More preferably, the minimum dimension of the pores or voids is between about 50 nm and about 300 nm. In particularly preferred the pores or voids have a minimum dimension of between about 100 nm and about 200 nm. The percent volume of the nanoporous α-alumina powders which is α-alumina can be varied depending upon the application. Generally, the α-alumina primary particles account for between 1 and about 75 percent by volume of the nanoporous α-alumina powders. More preferably the α-alumina primary particles account for between about 10 to about 75% or between about 10 to about 50% by volume of the nanoporous α-alumina powders.

The architecture and arrangement of the voids and pores in the nanoporous α-alumina particles are not particularly limited. Although not wishing to be bound by theory, the architecture, size and arrangement of the voids or pores is typically a function of the size and physical properties of the water soluble organic polymer. In certain preferred embodiments, the interpenetrated array of pores or voids have a columnar or tubular structure. More preferably, the columnar or tubular structure have a diameter of between about 20 nm and about 250 nm or between about 50 nm and about 150 nm.

The invention further provides a nanosized α-alumina powder comprising α-alumina particles having an average particle size of less than about 100 μm and slurries comprising same. The nanosized α-alumina powders of the invention are typically prepared by milling, crushing or otherwise breaking apart nanoporous α-alumina powders of the invention to liberate the primary α-alumina particles of the porous α-alumina particles. More preferably, the primary α-alumina particles of the interconnected array have an average size of between about 10-100 μm, between about 20-90 nm, between about 25-80 nm, or between about 30-70 μm. Other preferred nanoporous α-alumina powders of the invention comprise an interconnected array of α-alumina primary particles, wherein at least 99% of the α-alumina primary particles have a size within about a distribution of about 10 nm.

Preferred slurries of the invention comprise one or more nanosized α-alumina powders of the invention. Preferred nanosized α-alumina powders include any nanosized α-alumina powders described herein. More preferred slurries include those slurries in which the α-alumina particles of the nanosized α-alumina powder are dispersed in an aqueous mixture. Preferred aqueous mixtures include water, particularly deionized or distilled water, aqueous solutions comprising one or more surfactants, organic acids, or other additives. Preferred additives are chemically inert to α-alumina under storage or polishing conditions. Additionally preferred additives are capable of inhibiting aggregation of α-alumina particles in an aqueous mixture. Particularly preferred additives to the aqueous mixture include organic acids such as acetic acid, formic acid, lactic acid, glycolic acid, citric acid, oxalic acid, and other carboxylic acids having less than about 6 carbon atoms.

Other preferred slurries of the invention comprise one or more nanosized α-alumina powders of the present invention. That is, slurries of the invention can comprise a single particle size of α-alumina or a composite mixture of two or more particles sizes from two or more nanosized α-alumina powders of the invention having different average particle sizes which when mixed combine to form a mono-modal, bi-modal, or poly-modal particle size distribution. Typically slurries comprising α-alumina particles having a single average particle size distribution are preferred.

Aqueous slurries of the present invention typically have a pH of between about 2 and about 11. In certain preferred applications, slurries having an acidic pH or an alkaline pH are desirable. Thus more preferred aqueous slurries of the invention have a pH of from about 1 or 2 to about 6 or between about 8 and about 10.5.

The slurries of the invention are suitable for use in a variety of applications including use as abrasives in polishing or CMP applications, as supports for metal catalysts and the like.

In the manufacturing processes of the invention, any water soluble aluminum compound capable of forming α-alumina are suitable for use as the α-alumina precursor. Typically preferred starting materials include boehmite and molecular alumina precursors. The source of boehmite is not particularly relevant so long as the boehmite provides high purity Al(O)OH and may include both naturally occurring or synthetic boehmite. The molecular alumina precursors can be inorganic (Aluminum nitrate, aluminum chloride, aluminum sulfate, and the like) or organic (aluminum alkoxides, aluminum acetate, and the like). Boehmite is a particularly preferred starting material for the processes of the invention.

In preferred embodiments, a process for the production of nanoporous α-alumina powders is provided which comprises the steps of providing an inorganic sol comprising at least one alumina precursor and a plurality of α-alumina seed particles;

adding at least one water soluble organic polymer to the inorganic sol to form an organic-inorganic sol;

freeze drying the organic-inorganic sol to form a solid gel; and firing the solid gel at a temperature capable of combusting the organic polymer and inducing α-alumina formation of a nanoporous α-alumina powder comprising interconnected α-alumina primary particles.

It is generally desirable to have the seed particles substantially homogeneously dispersed throughout the gel to insure efficient seeding of the gel during firing.

For processes of the invention which comprise the use of a molecular aluminum compound as the α-alumina precursor, any water soluble organic or inorganic coordination complex or salt of aluminum may be suitable for use in the processes of the invention. Typically preferred molecular alumina precursors are selected from aluminum salts comprising one or more anions selected from alkoxides, aryl oxides, carboxylates, halides, sulphate, nitrate, oxalates, and acetoacetonates. Particularly preferred molecular alumina precursors include aluminum alkoxides, carboxylates, halides and nitrates.

Preferred aqueous-solutions provided or prepared by the processes of the invention comprise water, boehmite and/or a molecular alumina precursor, and α-alumina seed particles. When a molecular alumina precursor is employed, it is sometimes desirable for the aqueous solution to further comprise at least one acid. Preferred acids are selected from the group consisting of nitric acid, sulfuric acid, hydrochloric acid, hydrobromic acid, hydroiodic acid, acetic acid, formic acid, propionic acid and the like.

In preferred aqueous solutions, the α-alumina seed particles have an average particle size of less than about 125 nm, or more preferably less than about 100 nm. Particularly preferred seed particles have an average particle size of between about 30 nm and about 100 nm, between about 40 nm and about 80 nm, or between about 50 nm and about 70 nm.

Seed α-alumina particles are well dispersed in water and then the aluminum compounds are added to the water dispersion of the seed particles. It is desirable to increase the seeding efficacy of the water dispersion. Thus the concentration of the seeds is relatively high to increase the seeding power of the solution, e.g., the ratio of aluminum atoms in the product α-alumina particles originating in the seed versus the molecular alumina precursor is typically between about 1:3 and about 1:1000 or more preferably between about 1:6 and about 1:20. In preferred embodiments, the seed particles comprise between about 0.1 and about 25 weight percent of the product α-alumina powder. In particularly preferred embodiments the concentration of the seeds is about 1-15% or 1-10% by weight of the product α-alumina.

While not wishing to be bound by theory, the water soluble organic polymer, which is added to the aqueous solution of the alumina precursor and seeds, functions to create a domains of organic material within the sol. Thus the organic-inorganic sol formed from the aqueous mixture comprising α-alumina seed particles, an α-alumina precursor, and the water soluble organic polymer had discrete domains which are composed of the precipitated alumina precursor and the seed particles and domains of the solvated organic polymer. Freeze drying of the organic-inorganic sol results in a dried gel having domains of the alumina precursor and seed particles and domains of the organic polymer. Firing of the dried gel pyrolyzes the organic polymer creating voids and transforming the alumina precursor into α-alumina.

The invention contemplates the use of any water soluble organic polymer which burns cleanly at a temperature below the phase transition temperature of alumina and which is capable of forming organic-inorganic sols. Preferred water soluble organic polymers are selected from polyols, sugars, polyalkylene oxides, poly(meth)acrylic acid, poly(meth) acrylates, and mixtures thereof. Particularly preferred water soluble organic polymer include polyvinyl alcohol, polyethylene glycol or a mixture thereof.

The processes of the invention comprise a freeze drying step in which the organic-inorganic sol is frozen rapidly and water and other volatiles removed under a reduced atmosphere. Typically the sol is placed in a container with a high surface area to mass to insure rapid cooling and then rapidly frozen by contact with an atmosphere having an ambient temperature of less than 0° C., or more preferably less than −20° C., −30° C. or −40° C.

After the organic-inorganic sol is frozen, water is sublimed from the frozen sol to dry the organic-inorganic sol. In order to accelerate the drying process, the frozen sol is generally placed in a vessel from which the atmosphere is partially evacuated to generate a reduced pressure. Typically reduced pressures suitable for sublimation are 400 Torr or less, 200 Torr or less, 100 Torr or less or 50 Torr or less. In general, the lower the pressure the faster the rate of water sublimation. In preferred freeze drying steps provided by the invention, the frozen sol is heated to a temperature of between 0° C. and about 100° C. after exposure to a reduced pressure. More preferably, the frozen sol is heated to a temperature of between about 20° C. and about 80° C. or between about 40° C. and about 80° C. Generally, the rate of sublimation is inversely proportional to the pressure in the sublimation vessel and directly proportional to temperature.

The present invention provides new processes of preparing nanoporous α-alumina powders and nanosized α-alumina powders which comprise firing of a precursor gel at a temperature of less than about 1200° C. More preferably the firing temperature is between about 1000° C. and about 1200° C. or more preferably less than about 1100° C. More preferably, the firing is conducted at a temperature of between about 750° C. and about 1050° C. or more preferably between about 800° C. and about 1000° C. depending upon the molecular alumina precursor. The firing is genrally carried out under ambient atmosphere, i.e., air. However, other atmospheres, including oxygen enriched atmospheres, may be desirable in certain circumstances.

Preferred processes of the invention provide nanoporous α-alumina powders which are composed of an interconnected array of α-alumina primary particles having an average particle size of less than about 100 nm and an interpenetrated array of pores or voids. More preferably, processes of the invention provide nanoporous α-alumina powders in which the primary α-alumina particles of the interconnected array have an average size of between about 10-100 nm, between about 20-90 nm, between about 25-80 nm, or between about 30-70 nm. Other preferred processes of the invention provide nanoporous α-alumina powders in which at least 99% of the α-alumina primary particles have a size within about a distribution of about 10 nm.

Preferred processes of the invention provide nanoporous α-alumina powders in which the pores or voids have a minimum dimension of between about 20 nm and about 400 nm. More preferably, the processes provide nanoporous powders in which the minimum dimension of the pores or voids is between about 50 nm and about 300 nm, or, more preferably, between about 100 nm and about 200 nm.

The processes provide nanoporous α-alumina powders in which the percent volume α-alumina based on the total volume of the nanoporous α-alumina powder can be varied depending upon the application. Generally, the processes provide powders in which the α-alumina primary particles account for between 1 and about 75 percent by volume of the nanoporous α-alumina powders. More preferably, the processes provide powders in which the α-alumina primary particles account for between about 10 to about 75% or between about 10 to about 50% by volume of the nanoporous α-alumina powders (where the volume of the nanoporous α-alumina powder is the sum of the volume of the α-alumina primary particles and the volume of the void space).

In particularly preferred embodiments, the processes of the invention provide nanoporous α-alumina powders comprising α-alumina particles having an interpenetrated array of pores or voids which have a columnar or tubular structure. Preferably, the columnar or tubular pores have a diameter of between about 20 nm and about 250 nm, or, more preferably, have a diameter of between about 50 nm and about 150 nm.

The present invention also provides a process for the production of a nanosized α-alumina powder comprising α-alumina particles having an average particle size of less than about 100 nm, the process comprising the steps of:

providing a nanoporous α-alumina powder comprising interconnected α-alumina primary particles having an average particle size of less than about 100 nm and an interpenetrated array of pores or voids; and breaking the nanoporous α-alumina powder to form a nanosized α-alumina powder comprising the α-alumina primary particles of the nanoporous α-alumina powder.

Although any nanoporous α-alumina powder having a primary particle size of less than 100 nm is suitable for use in the process of the invention, preferred nanoporous α-alumina powders are prepared by the processes of the invention.

The nanoporous α-alumina powders of the invention are crushed, milled or otherwise broken up to generate a nanosized α-alumina powder comprising the primary particles of the nanoporous powder. Any means of breaking the interconnected array of α-alumina primary particles is suitable for use in: the methods of the invention and may include mechanical and ultrasound means. Mechanical breaking means are typically preferred. More preferred processes of the invention include milling the nanoporous particles to break the interconnected array of primary particles.

The present invention is further illustrated by the following examples which should not be construed as limiting in any way. The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

EXAMPLE 1

Polycrystalline alpha alumina powder milled with deionized water (DI water) in an attrition miller was used as seeds. 47.6 g of the alumina seeds in slurry (33.5 wt % in solid), was dispersed in 5400 g of DI water in a plastic container. 575 g of nitric acid (7%) was added to the solution, to which 600 g of commercial boehmite powder (Siral-1.5, Condea) was added. The solution was stirred vigorously for two hours in order to peptize the boehmite completely. 200 g of polyvinyl alcohol (PVA, molecular weight 11,000~31,000, J. T. Baker), was first dissolved in 800 g of water to make a 20 wt % PVA solution. The PVA solution was added to the boehmite solution and well mixed using a mixer for one hour.

Figure 2:
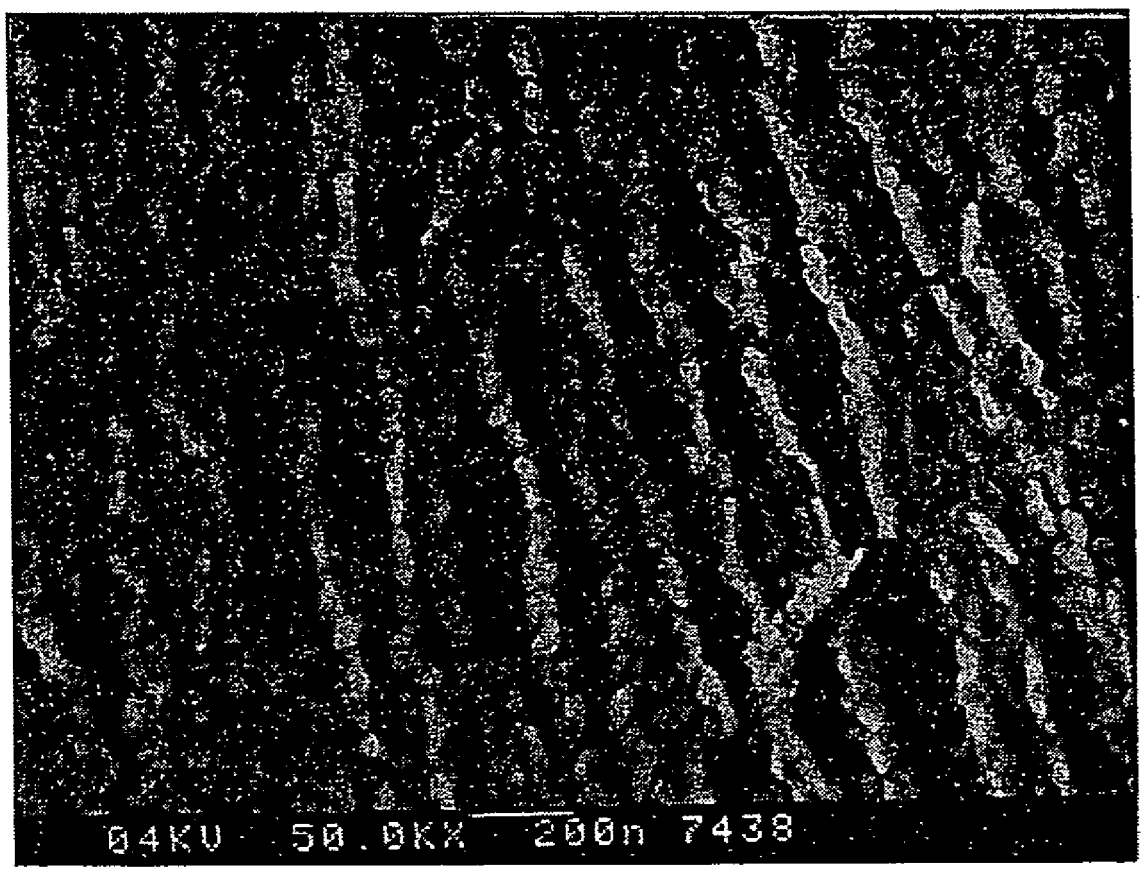
FIG. 2 is another scanning electron micrograph of the nanoporous α-alumina powder imaged in FIG. 1.

The solution was divided into stainless steel pans and put into a freeze drier chamber for freeze drying. The solution was first frozen down to −45° C. and then subject to sublimation at the temperature of 60° C. under vaccum. The total freeze drying process took ~72 hours. The as freeze dried material was sponge-like, white colored. The powder was fired in a box furnace at 1190° C. for one hour. After firing, the powder turned to highly fluffy, porous and very easy to ground in a mortal. It was confirmed based on X-ray diffraction and He density measurement, that the material was 98~100% alpha-alumina. SEM shows that the material was nanoporous and honeycomb-structured. The pores are oriented along the direction of the cooling and heating inside the freeze drier, presumably the pores were used as tunnels allowing water to sublimate. The SEM for cross section view of the material showed that the pores are around 150 nm in diameter. See, FIG. 1 and FIG. 2. BET measurement shows that the surface area of the material is 38.5 m2/g.

Figure 3:
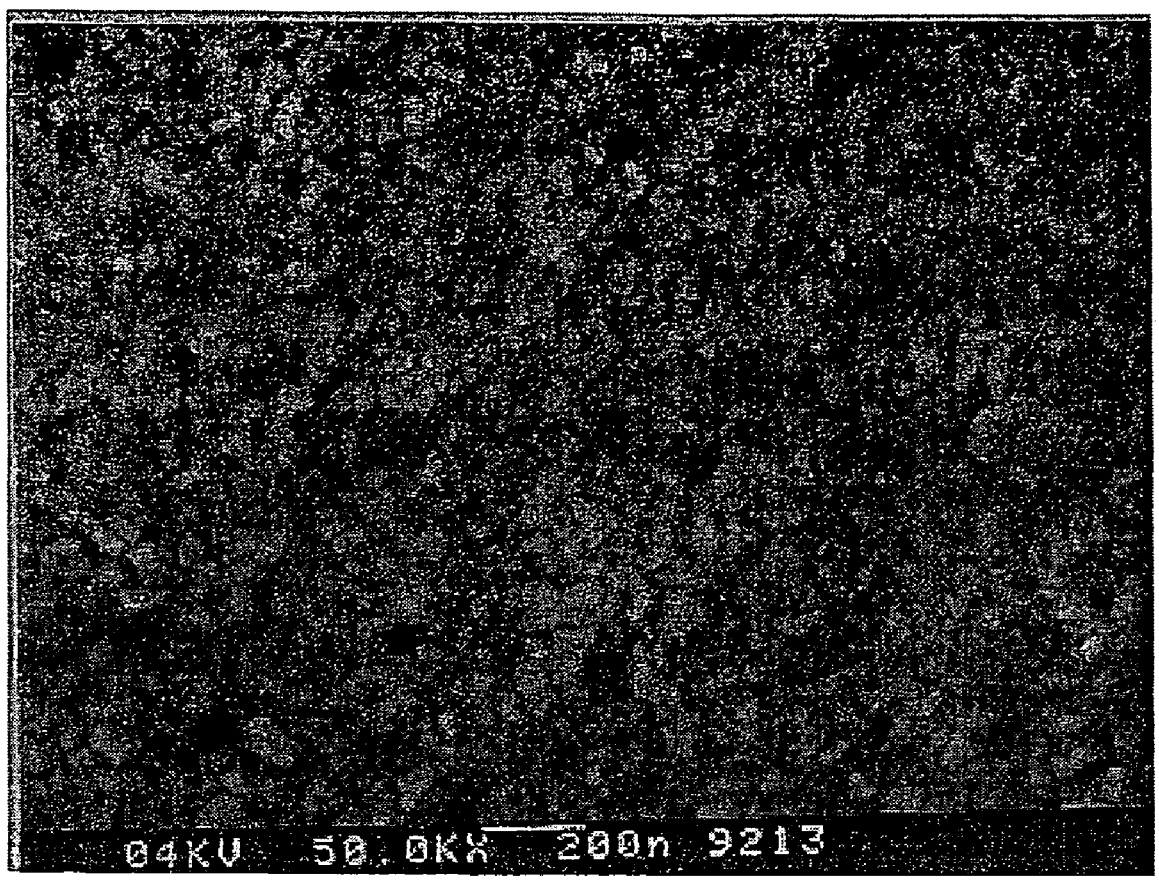
FIG. 3 is a micrograph of nanosized α-alumina particles of the invention prepared by milling a nanoporous α-alumina powder of the invention.

Due to the nanoporous, honeycomb structure, this material could be easily milled using an attrition miller within a short period of time (6 hours) into nanosized particles of alpha-alumina. FIG. 3 provides an SEM image of a slurry after milling.

EXAMPLE 2

Polycrystalline alpha alumina powder milled with DI water in an attrition miller, same as in Example 1, was used as seeds for the following processing. 47.6 g of the alumina seeds (33.5 wt % in solid), was dispersed in 5400 g DI water in a plastic container. 300 g of nitric acid (7 wt %) was added to the solution, to which 600 g of commercial boehmite powder (P2K, Condea) was added. The solution was stirred vigorously for two hours in order to peptize and disperse the boehmite completely. 2000 g of the solution of polyvinyl alcohol (PVA, molecular weight 11,000~31,000, 20 wt % was added to the boehmite solution and well mixed using a mixer for one hour.

The solution was divided into stainless steel pans and put into a freeze drier chamber for freeze drying. The solution was first frozen down to −45° C. before the sublimation at temperature of 60° C. under vacuum. The freeze drying were carried out for 72 days to allow complete drying. The freeze dried material was sponge-like, white colored. The powder was fired at 1000° C. for 1.5 hours. After firing, the powder turned to highly fluffy, porous. It was confirmed based on X-ray diffraction and He density measurement, that the material was ~100% alpha-alumina. SEM shows that the material was nanoporous, and had a honeycomb structure. The pores are oriented along the direction of cooling and heating inside the freeze drier, in the similar way as in Example 1. The size of the column is around 150 nm in diameter.

Due to the opened, nanoporous structure, this material after firing could be readily crushed and milled in an attrition miller using high purity of alumina as media. The milled materials gave average particles D50=90 nm, from a particle size analyzer.

Although a number of embodiments of the present invention have been described, it will become obvious to those of ordinary skill in the art that other embodiments to and/or modifications, combinations, and substitutions of the present invention are possible, all of which are within the scope and spirit of the disclosed invention.

What is claimed is:

1. A process for the production of nanoporous α-alumina powders which comprises the steps of
providing an inorganic sol comprising at least one alumina precursor and a plurality of α-alumina seed particles;
adding at least one water soluble organic polymer to the inorganic sol to form an organic-inorganic sol;
freeze drying the organic-inorganic sol to form a solid gel; and
firing the solid gel at a temperature capable of combusting the organic polymer and inducing α-alumina formation of a nanoporous α-alumina powder comprising interconnected α-alumina primary particles having an average particle size of less than about 100 nm and a plurality of voids,
wherein the α-alumina primary particles comprise between about 10-50 vol % of the nanoporous α-alumina powders, the volume of the nanoporous α-alumina powders being the total volume of α-alumina primary particles and the volume of void space.

2. The process of claim 1, wherein the alumina precursor is boehmite.

3. The process of claim 1, wherein the molecular alumina precursor is selected from aluminum salts comprising one or more anions selected from alkoxides, aryl oxides, carboxylates, halides, sulfate, nitrate, oxalates, and acetoacetonates.

4. The process of claim 1, wherein the α-alumina seed particles are homogeneously dispersed in the solid gel.

5. The process of claim 1, wherein the freeze drying step comprises:
freezing the organic-inorganic sol to a temperature of −20° C. or less; and
subliming water from the frozen sol at a temperature of between 20° C. and about 80° C. and a pressure of about 200 Torr or less.

6. The process of claim 1, wherein the firing is conducted at a temperature of between about 800° C. and about 1000° C.

7. The process of claim 1, wherein the α-alumina seed particles have an average particle size of less than about 125 nm.

8. The process of claim 1, wherein the α-alumina primary particles have a size of between about 30 nm and about 70 nm.

9. The process of claim 1, wherein at least 99% of the particle sizes of the α-alumina primary particles are distributed within a 10 nm range.

10. The process of claim 1, wherein the interconnected α-alumina primary particles are connected by a neck.

11. The process of claim 10, wherein the cross-section of the neck is between about 10% and about 90% of the cross-section of the α-alumina primary particles.

12. The process of claim 1, wherein the water soluble organic polymer is selected from polyols, sugars, polyalkylene oxides, poly(meth)acrylic acid, poly(meth)acrylates, and mixtures thereof.

13. The process of claim 12, wherein the water soluble organic polymer is polyvinyl alcohol, polyethylene glycol or a mixture thereof.

14. A process for the production of a nanosized α-alumina powder comprising α-alumina particles having an average particle size of less than about 100 nm, the process comprising the steps of:
providing an inorganic sol comprising at least one alumina precursor and a plurality of α-alumina seed particles;

adding at least one water soluble organic polymer to the inorganic sol to form an organic-inorganic sol;

freeze drying the organic-inorganic sol to form a solid gel;

firing the solid gel at a temperature capable of combusting the organic polymer and inducing α-alumina formation of a nanoporous α-alumina powder comprising interconnected α-alumina primary particles having an average particle size of less than about 100 nm and a plurality of voids, wherein the α-alumina primary particles comprise between about 10-50 vol% of the nanoporous α-alumina powders, the volume of the nanoporous α-alumina powders being the total volume of α-alumina primary particles and the volume of void space; and breaking the nanoporous α-alumina powder to form a nanosized α-alumina powder comprising the α-alumina primary particles of the nanoporous α-alumina powder.

15. The process of claim 14, wherein the nanoporous α-alumina powder is broken by milling to form the nanosized α-alumina powder.

16. The process of claim 1, wherein the α-alumina primary particles have a size of between about 20-90 nm.

17. The process of claim 1, wherein the α-alumina primary particles have a size of between about 25-80 nm.

* * * * *